Aug. 8, 1961 R. A. BERNARD 2,995,647
WELDING APPARATUS
Filed Nov. 25, 1957 3 Sheets-Sheet 1

INVENTOR.
Richard A. Bernard
BY
Mann, Brown & McWilliams
Attys.

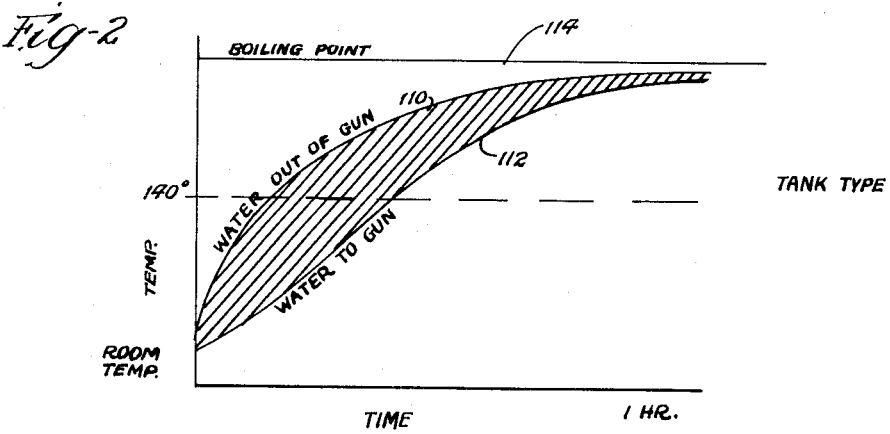
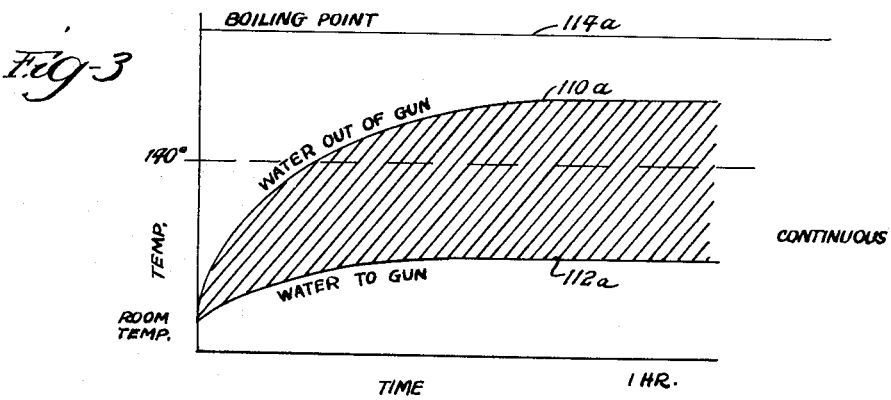
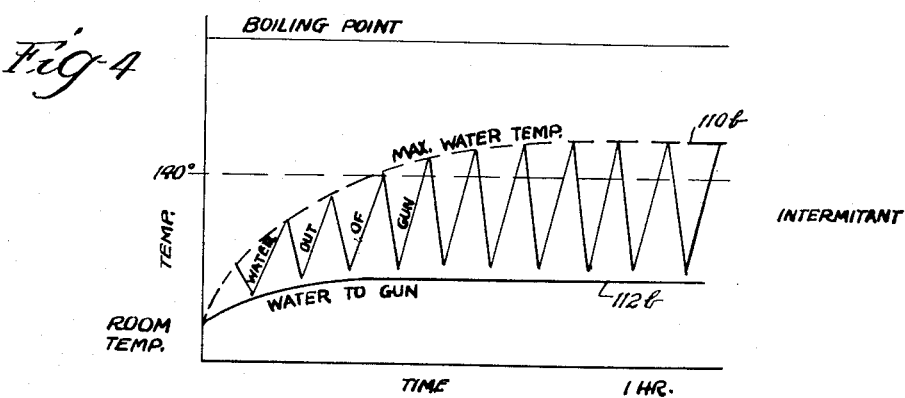

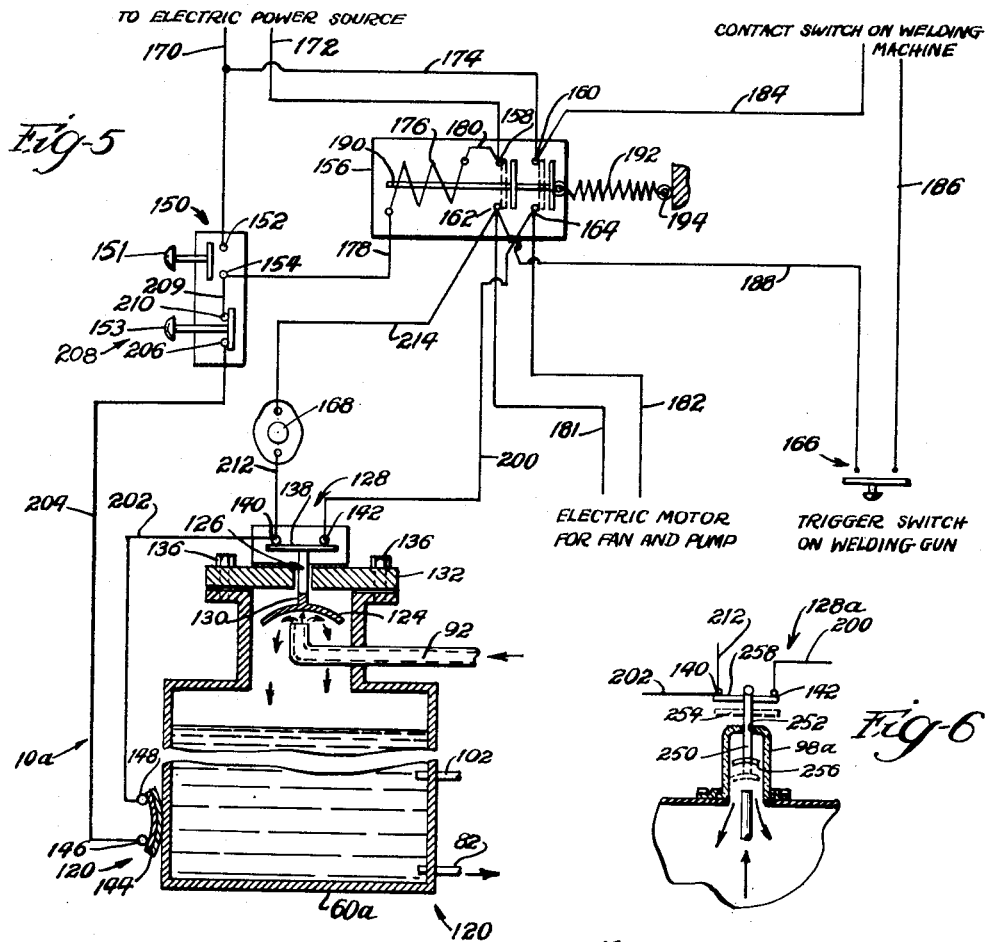

United States Patent Office 2,995,647
Patented Aug. 8, 1961

2,995,647
WELDING APPARATUS
Richard Allen Bernard, R.R. 1, Chicago Heights, Ill.
Filed Nov. 25, 1957, Ser. No. 698,451
11 Claims. (Cl. 219—130)

My invention relates to the metal arc welding art, and more particularly, to an apparatus and method for cooling welding equipment.

Metal arc welding at the present time is applied in about the same way and at the same speed that it was thirty-five years ago. The reason for this is that about ninety percent of all arc welding applied is done by what is commonly called manually applied flux coated electrode arc welding. Statistics show that more than fifty million pounds of electrode metal are deposited by this strictly manual process per month, and this tremendous volume of electrode poundage is melted and deposited at an average rate of only four pounds of electrode per hour per welding operator. At this depositing rate and with an average wage scale of $2.50 per hour, the cost of labor, not including overhead, for depositing each pound of electrode amounts to about $0.60 per pound.

The main factor which limits the speed of all metal arc welding processes is the density of welding current which can be conducted through the electrode; there are inherent characteristics in the manually applied flux coated electrode process which limit the amount of welding current that can be conducted through the electrode to about 10,850 amperes per square inch area of the electrode.

However, semi-automatic arc welding equipment is now available to the industry which is capable of using much higher welding current densities, as for example, densities of 100,000 amperes per square inch cross-sectional area of electrode and higher; these high current densities melt and deposit electrode metal at speeds of twenty pounds and more per hour per operator, which amounts to a labor cost of only about $0.08 per pound of deposited electrode.

In spite of the ready availability of this modern type of welding equipment, it is not being adopted by industry principally because the higher welding currents required necessitate cooling of the equipment, and no practical way of supplying coolant to the equipment has heretofore been devised.

The semi-automatic welding equipment referred to above, commonly called gun type welding equipment, mechanically feeds coiled lengths of electrode to a welding gun or torch that is manually held and directed along the course of welding by the operator. The size and weight of the welding gun and cable that supplies welding current to the gun are conventionally reduced by employing conductors of small cross-sectional area, and water cooling the conductors. The current conducting cable is made ⅛ or ⅒ the size of a cable that would be required without cooling, and is encased in a flexible hose through which water is circulated. The handle, body, and head portions of the welding gun through which the high currents are conducted are made of small lightweight tubes assembled in such a fashion that the same water used for cooling the cable is also conducted through the gun.

The main problem in properly cooling equipment of this type is the lack of a practical manner of supplying the coolant medium required.

Heretofore, the practice in most general use, where the above referred to semi-automatic equipment has been employed, has been to obtain the water that is used for cooling purposes from the municipal water system in the area where the welding is being performed. This type of water supply has been found to have the following disadvantages:

(a) The fabricating companies which could benefit most by the modern type of welding equipment are the fabricators that employ from 10 to several hundred arc welding operators who now deposit conventional stick-feed flux-coated electrodes. In such plants from 10 to as many as 100 and more operators are used in one area or in one section of the plant, comprising in some cases 10 to 50 thousand square feet of floor space. Therefore as it is, the floors are cluttered up with a mass of welding cable running from the welding machines to the weldments being welded; consequently, the management necessarily will hesitate to adopt the new high current, high speed welding processes, regardless of the economy these processes can make possible, because such adoption would necessitate further cluttering up the production area with a flexible hose running to each of the guns handled by each of the welding operators for supplying water thereto and a second hose leading from the gun for carrying away the heated water to drains in the floor which connect to the main sewer system.

(b) Using water from this source would no doubt necessitate at least a 50 foot length of hose for conducting water to each gun and a second 50 foot length for carrying the heated water from each welding gun to a drain in the sewerage system. This average total of 100 feet of hose for each welding gun used, times the number of operators in each department, would represent a high cost maintenance problem because the hoses are readily cut by objects falling on them and they are subjected to hard use as they are drawn over the floor as the operator moves from seam to seam and from job to job.

(c) Another disadvantage of using water from this source for cooling purposes is the cost of the water and in some areas the scarcity of water. For handling the volume of current being used today, which is only about ½ or ⅓ the volume of current which will eventually become standard practice, about one quart of water per minute is used, or, for a 100% duty cycle, 120 gallons per 8 hour day per operator. Therefore, in the many plants throughout the welding industry that employ 100 operators, 12,000 gallons of water would be required daily.

However, even apart from the disadvantages referred to above in using this source of water for cooling purposes, the harm done to the welding apparatus by the use of water from this source is enough to discourage its use. The harm done is in the mineral deposits which build up inside the small passageways in the guns through which the coolant circulates. Obviously, to achieve the desired reduction in bulk, the guns necessarily are made as small as possible; hence, the passageways for the coolant inside the guns are made small. In some cases, the annular passageways provide only 15 to 25 thousandths of an inch between the outer wall and the inner wall of the annular shaped passage. Mineral deposits, similar to the mineral deposits which build up in any vessel in which natural water is heated, build up in these small passageways and congest and completely restrict the flow of water through them. As these deposits are primarily composed of lime, there is no suitable method of dissolving them.

Prior to this present invention, apparatus has been available which eliminates the need for long lengths of hose for conducting cooling water to the welding apparatus and for conducting the heated water to drains in the sewerage systems. This prior art apparatus also eliminated the problem where the small passageways in the welding guns would become congested and plugged with mineral deposits; however, such apparatus only partially solves the problem. This conventional apparatus consists merely of a storage tank and a pump powered with an electric motor for circulating the coolant through the hose containing the welding cable and through the welding gun.

In certain cases a filter is used for filtering the coolant to insure that plain dirt and other small particles will not plug the aforementioned small passageways in the welding guns.

The main disadvantage of such an arrangement of apparatus is that the top limit of welding current which can be used by the new gun type welding processes is limited by the size of tank that is used for holding the coolant. To the best knowledge of this inventor, the largest capacity tank used for this purpose is 25 gallons and it is this size of tank which is furnished as standard equipment by at least one manufacturer for cooling the particular make of gun type welding apparatus which it makes for the welding industry. A 25 gallon tank of water, however, does not solve the problem because, in the first place, the weight of the water is 200 pounds, hence, the apparatus requires considerable floor space and is not readily portable, as it must be if long lengths of hose are to be eliminated. In the second place, this type of cooling apparatus can only be used for welding with the lower ranges of welding current because, although this arrangement of apparatus does remove heat from the welding cable and the welding gun, it does not provide for removing the heat from the coolant, with the exception of a small amount of heat which radiates from the outside surfaces of the tank; hence, this type of apparatus with a 25 gallon capacity is efficient for handling the high welding currents only for short periods of time, or for handling much lower and hence much less efficient currents for longer periods of time. The problem can be best understood by referring to specific data which are as follows:

At the present time common steel is being welded with the new gun-type welding apparatus with approximately 500 amperes and water cooled welding cables and welding guns manufactured and sold by several prominent manufacturers are designed for handling this volume of current. With 500 amperes, the gun-type equipment is capable of depositing about 30 pounds of electrode per hour as compared to about 4 pounds per hour per operator by the conventional stick-feed electrode processes. Without water cooling, a 4/0 size welding cable would be required for conducting the 500 amperes from the welding current machine to the manually held and manually directed gun. With water cooling, a No. 8 cable, which is only 1/13 as large in cross-sectional area and 1/10 as heavy as a No. 4/0 cable, is used for handling the 500 amperes. Proportionwise the same reductions in weight and bulk are made by water cooling the welding gun.

The welding guns are built to handle what is commonly called city water pressure, or 30 pounds pressure per square inch. At 30 pounds pressure, the passageways in the guns are of a size which restricts the flow of water to about one quart per minute. In general practice a small hose is connected between the coolant source and the welding gun, thus circulating the coolant through the gun and then through a second hose within which the welding cable is located. If the No. 8 welding current cable, which conducts the 500 amperes to the gun, does not exceed 15 feet in length, then the water which flows over the surface of the cable is not heated beyond 200° F.

There is a limit beyond which the welding gun cannot be handled, namely, a temperature of 140° F. A temperature of as much as 3 degrees above 140 will form blisters on the hand of the welding operator if held in the hand for 20 minutes or longer. Because of this limiting temperature factor, it is obvious why the circulated water must be used for cooling the gun before being used for cooling the welding cable.

It is of primary importance that the water cooling the cable does not reach the boiling point, since steam pockets would then form in the hose in which the cable is located; if this were to happen, the cable, having only about 1/10 the conductance requirements, would instantly flash out as does a safety fuse. Therefore, the cooling apparatus must be reliable in delivering the required volume of coolant continuously. Also, if the apparatus is to be completely reliable, provision must be made to prevent the welding operation from starting unless the cooling apparatus is operating; otherwise, both the welding gun and the welding cable will be destroyed within a few seconds after welding starts if proper cooling is not taking place.

Because of the above mentioned factors, it should be obvious why the plain tank cooling apparatus mentioned above cannot be used for prolonged welding periods. In the first place, a 25 gallon capacity tank, or even larger capacity tanks, is limited to only so many quarts, and hence, is limited to so many minutes of operation, because when welding first starts and the cooling water is at an average room temperature of 75° F., during the first minute one quart of the tank's capacity is heated to 200° F., the second minute, a second quart is heated to 200° F. and so on. On this basis, allowing for no heat radiation from the outside surfaces of the tank and by using round figures, the 25 gallons of water would be heated to 140° F. during the first 40 minutes of operation.

It could be reasoned that the cooling of the welding cable and welding gun might well be accomplished with a small portable refrigerator unit, of which, in fact, there are several makes and types on the market which require that refrigerant be circulated through the welding gun. These small portable refrigeration units, however, are not at all suitable for cooling the subject welding equipment because the coolant circulated through the welding gun must not be at a temperature lower than the temperature of the surrounding air where the guns are used; otherwise, moisture will condense on the inner and outer surfaces of the guns, which in turn would be evaporated by the heat of the arc, and the water vapor would cause extremely porous low quality welds.

Also, the medium used for cooling the welding cable must be a liquid and not refrigerants in the form of a gas; otherwise, as earlier mentioned, the welding cable will flash out as does a safety fuse in an electrical circuit.

A principal object of my invention is to provide a method of and apparatus for cooling gun-type arc welding equipment which will enable the outstanding economy made possible by this modern type of equipment to be fully realized.

A further principal object of the invention is to provide an apparatus for cooling welding equipment which is self-contained, portable, and enables the welding equipment to be continuously operated for unlimited periods of time.

Another object of the invention is to provide welding equipment including a self-contained cooling unit and safety devices for keeping the welding operator apprised of whether the cooling unit is functioning, and capable of warning him in the event of malfunction.

A further object of the invention is to provide a cooling apparatus for welding equipment which is specifically designed to remove heat from the coolant, and which so efficiently removes heat from the coolant that only a small quantity of coolant is required.

Still a further object of the invention is to provide a self-contained coolant apparatus for welding equipment which permits recirculation of the coolant while at the same time reduces the bulk and weight problem to a minimum.

Yet a further object of the invention is to provide a method of cooling welding apparatus that permits gun-type semi-automatic welding apparatus to be efficiently operated continuously for long periods of time.

Other objects, uses, and advantages will be obvious or become apparent upon a study of the following detailed description and the application drawings.

In the drawings:

FIGURE 2 is a typical time temperature curve for a conventional tank and pump coolant system wherein the system depends upon the amount of water in the tank for its efficiency of operation;

FIGURES 3 and 4 are graphs illustrating time temperature curves provided by one embodiment of my invention;

FIGURE 5 is a diagrammatic view illustrating a modified form of the invention including a safety circuit for protecting the welding equipment against malfunction of the cooling unit;

FIGURE 6 is a diagrammatic fragmental view illustrating a further embodiment of the invention; and FIGURES 7 and 8 are diagrammatic perspective views illustrating modified forms of the invention.

Figures 1, 1A:
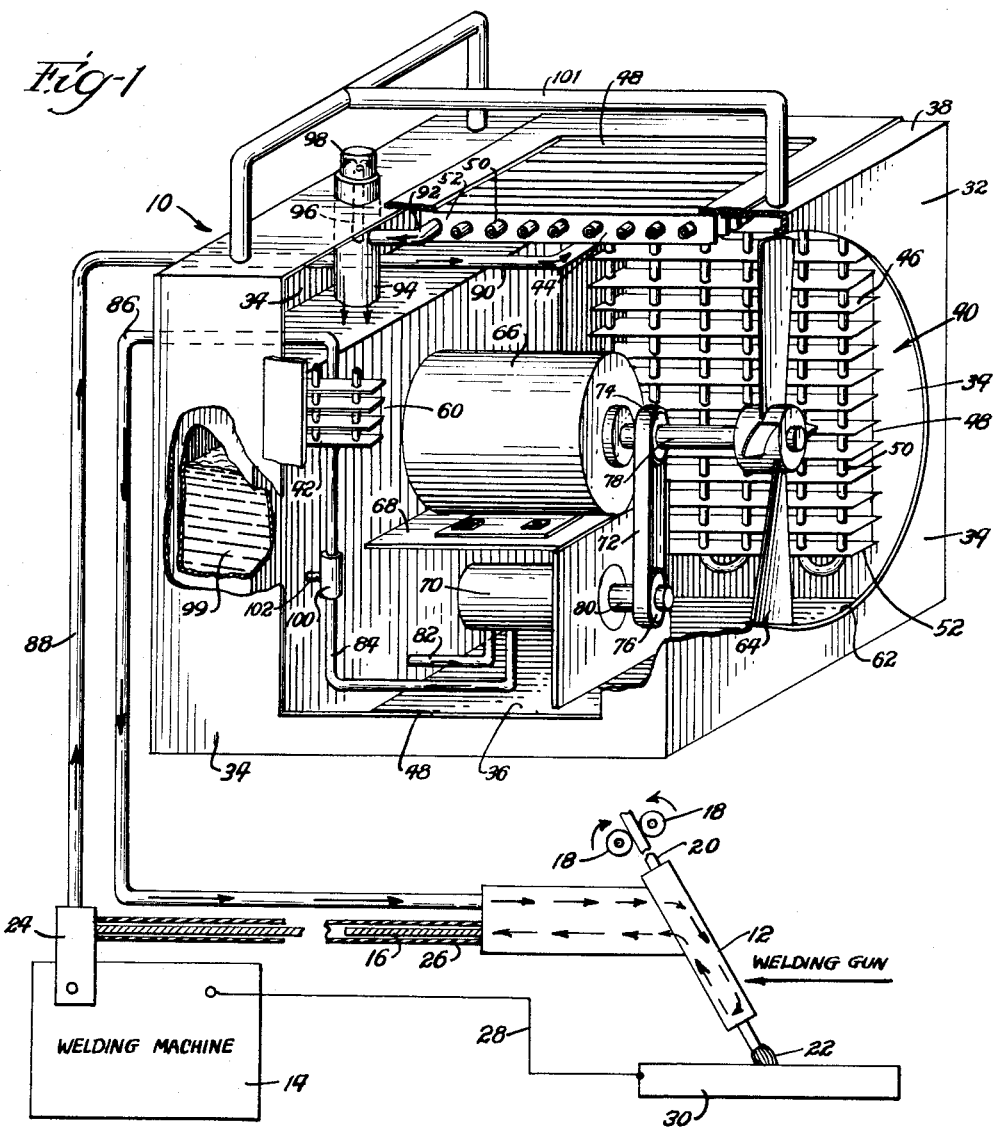
FIGURE 1 is a diagrammatic view, partially in perspective, illustrating one embodiment of my invention as employed in cooling gun-type welding equipment.
FIGURE 1a is a diagrammatic perspective view of the radiator arrangement of the embodiment of FIGURE 1, looking from the lower portion of FIGURE 1 and indicating how the radiators are connected together.

Referring first to the embodiment of FIGURE 1, reference numeral 10 generally indicates one form of coolant apparatus in accordance with my invention operably connected to welding gun 12 and welding machine 14 for the purpose of cooling gun 12 and welding cable 16.

Gun 12 and welding machine 14 are illustrated only diagrammatically as they are conventional and may be arranged in any suitable manner. As is well known in the art, rollers 18, driven in any suitable manner in the direction of the arrows feed an electrode 20 through gun 12 to arc 22 that is established by connecting the gun 12 to a suitable source of welding current, such as welding machine 14. This is conventionally done by means of welding cable 16 which extends between a conventional adaptor 24 of the welding machine and the gun. As is well known in the art, the cable 16 is relatively small in diameter and is encased in a flexible tube 26 through which cooling water is passed about the cable to cool same during the welding operation. Lead 28 completes the circuit between the workpiece 30 and the welding machine 14.

Of course, welding machine 14 is incorporated in an appropriate actuating circuit in any manner known to the art.

The apparatus 10 comprises a housing 32 including sides 34, bottom 36, and top 38. The housing 32 encloses and defines an air compression chamber 40 about which radiators 42, 44, and 46 are mounted. The sides 34 and top 38 are each formed with a window 48, and the respective radiators are mounted within the chamber 40 coextensively with a window 48. As indicated in FIGURE 1a, the radiators are connected in series and each comprises a conduit 50 formed in a tortuous path and passing through a plurality of fins 52 that form the heat radiating surfaces of the radiators. The conduits 50 of the radiators are connected together in any suitable manner so that the water passing through the radiators passes through them consecutively.

The apparatus 10 includes a coolant reservoir 60 positioned in housing 32 opposite rounded air intake opening 62 formed in one of the side walls 34. A fan 64 having blades substantially equal in length to the diameter of opening 62 is mounted in opening 62 and is actuated by an appropriate electric motor 66 supported in any suitable manner within housing 32, as by appropriate bracket means 68, which is only diagrammatically illustrated. Motor 66, which is connected to an appropriate source of electrical energy that may or may not be electrically associated with the circuiting for welding machine 14, drives a pump 70 through pulley belt 72 trained over appropriate pulleys 74 and 76 that are respectively keyed to appropriate shafts 78 and 80, respectively.

Pump 70 may be of any appropriate type, but is preferably a positive displacement gear type pump. An appropriate conduit 82 extends between the bottom of the reservoir 60 and pump 70 while appropriate conduit 84 leads between pump 70 and flexible hose 86 which is connected to the welding gun 12 in a conventional manner. Hose 88 extends between adaptor 24 of welding machine 14 and conduit 90 within housing 32, the latter being connected to the upstream radiator 46. The downstream radiator 44 is connected by an appropriate conduit 92 to the reservoir 60. Conduit 92 in the embodiment of FIGURE 1 enters upwardly extending sleeve or tube 94 and is provided with a right angled portion 96, which positions the end of tube 92 adjacent to the top of transparent bowl 98 fixed in the portion of tube 94 which extends above the top 38 of the housing. Water flowing under pressure from tube 92 is directed against bowl 98 and then drops into the main body of water contained in the reservoir.

The reservoir is provided with an appropriate supply port and substantially filled with water 99, some space being left at the top of the reservoir to allow for expansion. An appropriate drain port may also be provided.

The apparatus 10 is provided with an appropriate handle 101 so that the welding operator can carry the unit as he moves from job to job.

In operation, the motor 66 is turned on to start circulation of the water through the gun 12 and about cable 16 before welding commences. As soon as the operator observes coolant flowing against bowl 98, he knows that the coolant is circulating through the various conduits, the gun, and about the welding cable 16, and that the welding apparatus is in condition for welding. Moreover, the transparent bowl 98 provides a constant check on liquid flow through the coolant system, since the flow is made readily visible to the operator.

The fan 64 in effect packs air into the chamber 40, which then blows outwardly of windows 48 and past series connected radiators 42, 44, and 46. As the air does not cool the radiators consecutively, the cooling effect on the radiators is materially greater than it otherwise would be. The high volume of air flow and large radiation area effects such a positive removal of heat from the coolant that a surprisingly small amount of water will provide the cooling required, even for continuous operation over extended periods of time. Since the volume flow of air is directed at reservoir 60, an additional cooling effect is had at that point in the coolant system.

The illustrated and above described embodiment is designed for welding equipment which is to handle 500 amperes of welding current. My apparatus permits such equipment to operate continuously over unlimited periods of time. A specific embodiment of the apparatus which is designed for use in connection with apparatus employing 500 amperes conducted through a cable 16 No. 8 size and 15 foot in length is a unit 12¾ inches wide by 14 inchs long by 14 inches high, thus having a cubic displacement of only 1½ cubic feet. The reservoir 60 is designed to hold 9 quarts of water, but only 8 quarts are used to allow for expansion during heating. The weight of the coolant unit including the water in the reservoir is only 89 pounds. Thus, one of these units occupies only about 1¼ square feet of floor space in a welding department (meaning that, for instance, 100 of the units would occupy only 126 square feet of floor space in a department where 100 welding operators are applying gun-type welding).

As mentioned above, most conventional types of welding guns are designed to withstand only 30 pounds pressure per square inch, and the passageways in the guns are so restricted in size that the flow of liquid is restricted to about 1 quart per minute at 30 pounds pressure. In the illustrated embodiment, pump 66 is of the gear type and is designed to pump 1¾ quarts of liquid per minute at a pressure of 200 pounds per square inch. To protect the welding gun 12 against high pressures, a bypass check valve 100 is employed in conduit 84. Valve 100 may be of any appropriate design and includes conduit 102 which returns excess liquid to the reservoir. This valve 100 is set at 30 pounds per square inch.

The motor 66 may be of any conventional type, and in the specific embodiment described above, is a ⅓ horsepower motor, and fan 64 is a four-bladed 12-inch fan. The diameter of opening 62 should not exceed by more than five percent the length of the fan blades, as tests have shown that a relatively close fit between the rim of the opening and the ends of the fan blades is required to keep the air packed into chamber 40 by the fan from escaping out between the fan blades and said rim. The radiation surface provided by fins 52 is equivalent to 2½ times the area of fan opening 62, and the imperforate chamber defining portions of the housing preferably have a total area (which may be termed the superficial area of the chamber) that is not greater than approximately 2½ times the total area of the radiator openings or windows 48. In the illustrated embodiment, the latter is computed on the basis of a 12¾" by 14¾" by 10¾" (thus defining a volume on the order of one cubic foot) chamber having three 8" by 10" radiator openings and a 12" fan opening.

I have established in research that it takes a minimum of 20 square feet of radiation surface to handle the heat that is developed when 500 amperes is conducted through a 15 foot length of size No. 8 cable, plus the heat which develops in the undersized current conducting members of the gun 12. I have also established that the volume of air which is moved over the radiating surfaces of the radiators 42, 44, and 46 is also important and in the specific embodiment described above, research has shown that a minimum of 600 cubic feet of air per minute is required. Of course, smaller sized units can be provided if the volume of heat to be removed is less, as by reducing the square feet of radiation surface and reducing the size of the motor which powers the pump and fan. Conversely, a larger capacity unit can be provided for handling higher welding currents, which would provide higher speeds of welding by increasing the volume of coolant circulated and by increasing the radiation area and the volume of air moved over the radiation area.

I have determined that for efficient operation of units in accordance with my invention, a minimum of four square feet of radiation surface with a minimum of 30 cubic feet of air per minute moving over the radiation surface should be provided for each 100 amperes of welding current used. Of course, the conductance of the welding cable and the welding gun has some bearing on any specific design that is to be employed.

The illustrated arrangement of the radiators is quite important as it provides a very efficient movement of air through them. It will be noted that the radiators each are a single tube disposed in a single plane and that therefore there is very little resistance to air passing through them. The radiators are disposed about chamber 40 so that the air which is packed into the chamber by the fan 64 is forced by each radiator concurrently, with the result that each radiator is bathed in a fresh bath of air, and as indicated above, the combined surface area of the three radiators through which the air flows is about 2½ times the area of the fan opening. The relationship between the imperforate chamber defining wall area and the area of the radiators mentioned above provides optimum operating conditions while permitting the size of the apparatus to be kept at a minimum. The chamber can be larger or smaller in capacity, but this would be considered detracting from the effectiveness of the invention.

Referring now to FIGURES 2 through 4, FIGURE 2 illustrates a typical time temperature curve for a conventional tank and pump cooling system of the type wherein the efficiency of the system depends upon the amount of water in the tank. Curve 110 illustrates the time temperature curve of the water leaving the welding gun while curve 112 illustrates the time temperature of the water approaching the gun. The curves illustrated are based on a continuous run test, and it will be noted that both curves 110 and 112 approach the boiling point indicated by line 114 after approximately one hour of operation.

The slope of both the curves of FIGURE 2 depends upon the type of duty cycle employed in the operation of the welding equipment and the amount of water in the tank of the cooling system. The curves of FIGURE 2 approximate the conditions found in apparatus employing a tank containing 20 gallons of water that cools a welding gun and 15 feet of No. 8 cable operating at 500 amperes, the water being circulated at about 1 quart per minute. Of course, the coolant reaches the unbearable temperature of 140° F. considerably before the one hour period expires. The only way to improve on the curves of FIGURE 2 is to use larger and larger reservoirs of water; as industry presently refuses to accept coolant apparatus that employs 25 gallons (or 200 pounds of water), it is apparent that this is not a satisfactory solution to the problem.

The graph of FIGURE 3 represents the time temperature curves for one embodiment of my invention. The data for plotting the curves was taken from a test run under the same conditions that provide the results of FIGURE 2. It will be noted that curves 110a and 112a are held well below the boiling point indicated by line 114a and thus the efficiency of operation of the apparatus is not dependent upon the amount of water employed in the reservoir; rather, the efficiency is based on the heat removing capacity of the radiators. In my invention, it would be possible to maintain equilibrium temperatures equal always to room temperature if the radiators employed were large enough and enough air was forced through them. However, I have found that a unit of the type described above employing a 12-inch fan forcing air through radiators with a radiation surface of 240 square inches produces a very economical unit of considerably less than ½ the weight and size of a conventional 20 gallon tank pump system, and reaches an equilibrium temperature of 160° F. for curve 110a and 110° F. for curve 112a under continuous operating conditions of 500 amperes conducted through a 15 foot length of size No. 8 cable.

The graph of FIGURE 4 is a variation in the curves of FIGURE 3 and illustrates more realistically actual operating characteristics where welding is done intermittently, and where the coolant liquid is allowed to circulate during the period when welding is not done as well as during actual welding time. It will be noted that curve 110b has a saw tooth shape which is due to the fact that heat radiation is taking place during inactive periods as well as during actual welding periods. This, of course, results in a still lower maximum coolant temperature and hence a lower temperature of coolant conducted to the gun.

The embodiment 120 of FIGURE 5 illustrates a modification of the embodiment of FIGURE 1 including a wiring diagram for operating the welding apparatus and cooling unit as a whole. The wiring diagram is of particular importance as it includes certain safety features which protect the welding gum and welding current from being burned out.

Reference numeral 60a of the embodiment 120 illustrates a reservoir that is generally similar to that shown in FIGURE 1, and which may be mounted in housing 32. Conduits 82, 92, and 102 are arranged in the embodiment of FIGURE 5 substantially as shown in FIGURE 1. The discharge from conduit 92 is directed against a cupped portion 124 of vertically movable actuating member 126 forming a part of a flow switch 128. Member 126 includes an elongate portion 130 slidably mounted in reservoir cover 132 that is secured to the reservoir by appropriate bolts 136. Member 126 includes a disc-like electrical contact portion 138 which is raised to close terminals 140 and 142 when the coolant discharges from conduit 92 against dished portion 124 and is maintained in this position by continued liquid flow. After the coolant engages dished portion 124, it drops into the body of liquid contained in the reservoir as indicated by the arrows.

When the pumping action on the coolant is discontinued, the flow through conduit 92 stops and member 126 falls (under the action of gravity) away from contacts 140 and 142 to open switch 128.

The reservoir 60a is also provided with a normally closed thermo-switch 144 of any conventional design including contacts 146 and 148.

In practice, the reservoir 62a is assembled with the remainder of the coolant apparatus shown in FIGURE 1 and the switches 128 and 144 are connected in the circuit illustrated in FIGURE 5.

The main components of the circuit of FIGURE 5 are a start push button switch 150 including normally open push button 151 and its contacts 152 and 154, and normally closed stop switch 208 including push button 153 and its contacts 206 and 210, a normally open relay switch 156 including line side contacts 158 and 160 and load side contacts 162 and 164, a normally open trigger switch 166 which is mounted on gun 12 in any conventional manner (gun 12 ordinarily being provided with a switch of this type), and indicating light 168, the normally open flow switch 128 and the normally closed thermoswitch 144.

In putting the apparatus of FIGURE 5 in condition for welding, conductors 170 and 172 are connected to terminals 152 and 158, respectively. A conductor 174 extends from conductor 170 to terminal 160 of the relay switch. Switch 156 includes coil 176 having one of its ends in electrical contact with a conductor 178 that is connected to terminal 154 of switch 150, and the other of its ends connected to conductor 180 that is in turn connected to terminal 158.

Conductors 181 and 182 connect terminals 162 and 164 of switch 156 to motor 66; lead 184 connects relay switch terminal 160 with the conventional contact switch (not shown) on welding machine 14, lead 186 extends between said machine contact switch and gun trigger switch 166, while lead 188 extends between trigger switch 166 and relay switch terminal 162.

When button 151 is pressed to close contacts 152 and 154, relay coil 176 is energized which closes the relay switch contacts, as indicated in dashed lines, the magnetic field induced by the current flowing through coil 176 acting on core member 190 to draw same to the left of FIGURE 5 against the action of, for instance, tension spring 192 that is secured between the end of the core member and a fixed element 194. The motor 66 is therefore supplied with current which starts the fan and pump of the coolant apparatus into operation. This also readies for closure the circuit in which the welding machine and welding gun trigger 166 have been incorporated, the circuit for welding current between the welding machine and the welding gun being omitted from the showing of FIGURE 5.

In accordance with my invention, a safety circuit is provided to keep relay coil 176 energized when the pressure on starting button 151 is removed and the switch opens under the action of a conventional spring or springs (not shown). The safety circuit comprises a conductor 200 that extends between terminal 164 of relay switch 156 and terminal 142 of flow switch 128, a conductor 202 which extends between terminal 140 of flow switch 128 and terminal 148 of thermo-switch 144, and a conductor 204 that extends between thermo-switch terminal 146 and a terminal 206 of stop switch button 153. A lead 209 extends between terminal 210 of switch 208 and terminal 154 of switch 150.

In addition, light 168 is connected by leads 212 and 214 to flow switch terminal 140 and relay switch terminal 162, respectively.

When motor 66 is actuated by pushing button 151, it starts the coolant liquid flowing through the coolant system formed by the various flow conducting conduits. The button 151 must be manually held closed until the full flow of the coolant is brought to bear against dished portion 124 of switch 128. When coolant flow is achieved, switch 128 closes and is maintained closed, which completes the safety circuit that keeps relay switch coil 176 energized after button 151 is released. The closing of switch 128 also illuminates indicating light 168, which remains illuminated so long as the safety circuit is closed. The indicating light 168 thus indicates at all times whether or not the coolant apparatus is operating efficiently.

The safety circuit remains closed as long as the coolant liquid remains directed at full flow against dished portion 124 of flow switch 128. If the liquid flow is reduced for some reason, the member 126 drops away from contacts 140 and 142 and the flow switch opens, thus opening the safety circuit, whereupon coil 176 is de-energized and the supply of welding current to the torch ceases. Also, indicating light 168 goes out, thus indicating that flow switch 128 has opened.

The apparatus may be intentionally stopped by pressing button 153 to open contacts 210 and 206.

Thermo-switch 144, being in good heat transfer relation with the reservoir, provides an additional safety feature, as the switch is designed to open when the temperature of the cooling liquid in the reservoir reaches a predetermined amount, such as the aforementioned 140° F. The switch is secured to the reservoir in any suitable manner as by cementing or the like.

I have found that switch 144 is necessary because of the human element involved in operating the welding apparatus. For instance, the welding operator may attempt to use welding currents which are above the capacity of the welding apparatus, or the radiators after a considerable period of service may become plugged with dirt, thereby reducing the volume of air that can pass through them and adversely affecting heat transfer between the radiators and the air. Also, the fan may become loose on the motor shaft, and there are other possible occurrences which may adversely affect the withdrawal of heat from the coolant liquid.

In the embodiment of FIGURE 6, a plunger member 250 is mounted in bowl 98a, which is the same as transparent bowl 98 of FIGURE 1, except that it is formed with a perforation 252 to slidably receive stem 254 of member 250. The liquid flowing from tube 92 impinges against cupped portion 256 of member 250 to raise electrical contact disc 258 thereof into engagement with contacts 140 and 142 of a switch 128a that is similar to switch 128, contacts 140 and 142 being connected in a circuit such as that shown in FIGURE 5.

Flow switch 128a operates in the same manner as switch 128, but makes the liquid flow visible to the operator.

It is important to note that, in the apparatus of FIGURE 5, the welding gun cannot be energized with welding current until the coolant circulating apparatus is in operation.

It is to be understood that FIGURE 1 illustrates only one of several possible embodiments arranged in accordance with the principles of my invention. Several variations are illustrated in FIGURES 7 and 8, but others will now be apparent to those skilled in the art.

In the embodiment 10b of FIGURE 7, the reservoir 60b is positioned at the top of the housing 32b, and two series connected radiators 46 are employed instead of the three in the embodiment of FIGURE 1. In the embodiment of FIGURE 1, the radiators may be eight inches by ten inches in size, making a total of 240 square inches of opening required for the three radiators. If two radiators were employed, as in the embodiment of FIGURE 7, they need be only ten inches by twelve inches each, totaling the 240 square inches. The reservoir 60b and the radiators 46 are connected in the coolant circulation system in any manner following the teachings of my invention.

In the embodiment 10c of FIGURE 8, the reservoir 60c is located at the bottom of the housing, which permits a fourth series connected radiator 46 to be located in the side of the housing 32c occupied by the reservoir 60 in the embodiment of FIGURE 1. The reservoir 60c and the radiators likewise may be connected in the coolant circulation system in any manner following the teachings of my invention. I have established, however, that the use of a fourth radiator does not materially increase the efficiency of the apparatus to any appreciable degree beyond what I produce with three radiators, and further, that the use of a fourth radiator does not permit an over-all reduction in size of the apparatus to make it more portable, since the over-all size of the chamber is governed in greater part by the size of the fan required to pack the required cubic feet of air into the chamber for movement out through the radiators.

Cooling apparatus arranged in accordance with my invention is completely self-contained except for a source of electrical power. It is highly compact and unusually portable, and the positive removal of heat from the coolant insures efficient and continuous welding for long periods of time. The safety features of FIGURES 5 and 6 insure the protection of the expensive gun-type welding equipment in the event of operational difficulties in the cooling system. The close fit between the fan blades and the rim of the fan opening of the housing insures that substantially all of the air forced into the air compression chamber is brought into heat exchange relation with the radiators.

The foregoing description and the drawings are given merely to explain and illustrate my invention and the invention is not to be limited thereto, except in so far as the appended claims are so limited, since those skilled in the art who have my disclosure before them will be able to make modifications and variations therein without departing from the scope of the invention.

I claim:

1. Apparatus for cooling arc welding equipment comprising housing means forming an air compression chamber, said housing means being formed at one side thereof with a relatively large opening, fan means operable in said opening to force a large volume flow of air into said chamber, said housing means being formed with a reservoir that is positioned across said chamber from said fan means, radiator means extending about a substantial portion of said chamber and between said fan means and said reservoir, said housing means being formed to provide substantially unobstructed opening means in said chamber that is substantially coextensive with said radiator means, conduit means adapted to connect said radiator means, said reservoir and the welding equipment into a closed coolant circulation system, pump means interposed in said conduit means, said reservoir being adapted to receive a sufficient quantity of a heat absorbing liquid to substantially fill said system on operation of said pump means.

2. Apparatus for cooling gun-type arc welding equipment comprising housing means forming an air compression chamber, said housing means being formed by four side walls, a top wall and a bottom wall, one of said four side walls being provided with a round opening within which a pressure type fan operates to pack air into said compression chamber, at least two of said side walls being provided with openings through which air escapes from said compression chamber, radiators extending over said openings through which substantially all of said air must pass to escape from said compression chamber, one of said walls being formed to provide a reservoir for a coolant, a motor driven pump contained within said chamber to draw coolant from said reservoir, and conduit means adapted to connect said reservoir, said pump, the gun-type arc welding equipment, and said radiators into a closed coolant circulating system, said reservoir being proportioned to receive a sufficient quantity of a heat absorbing liquid to substantially fill said system when circulated by said pump.

3. The apparatus set forth in claim 2 wherein said reservoir is formed to be the bottom wall of said compression chamber.

4. The apparatus set forth in claim 2 wherein said reservoir is formed to be the top wall of said compression chamber.

5. The apparatus set forth in claim 2 wherein the area of said openings over which said radiators extend and through which air escapes from said compression chamber is not less than two times the area of said round opening within which said pressure fan operates to pack air into said compression chamber.

6. The apparatus set forth in claim 2 wherein the total superficial area of said chamber is not greater than 2½ times the total area of said openings over which said radiators extend.

7. The apparatus set forth in claim 2 wherein said round opening in which said pressure type fan operates does not exceed in diameter by more than five percent the length of the fan blades.

8. Apparatus for cooling arc welding equipment comprising gas impervious means forming a chamber, heat exchange means mounted in said chamber, means for supplying gas under pressure to said chamber, said chamber being formed with a gas escape window and said heat exchange means overlying said window, conduit means for communicating between the welding equipment and said heat exchange means, pump means interposed in said conduit means, and a reservoir for containing a heat absorbing liquid in communication with said conduit means and adapted to be circulated by said pump means, said conduit means including an inverted transparent bowl exposed for observation and a conduit discharging against said bowl, whereby the flow of the heat absorbing liquid in said conduit means may be visually observed.

9. Heat exchange apparatus comprising fluid impermeable means forming a housing defining an air compression chamber, said housing having first and second windows formed therein, a radiator device overlying said first window and comprising a continuous liquid conducting tube defining a tortuous circuit and thermally connected to a plurality of spaced heat conducting fins, said fins and said tube being proportioned to make said radiator device substantially coextensive with the opening of said first widow, means for supplying a liquid to be cooled to one end of said tube, an air impelling device positioned in said second window, said impelling device comprising air impelling blades acting over an area that is substantially the same as the area of the space defined by said second window, and means for actuating said blades to pack said chamber with air, whereby on actuation of said blades a high volume air flow is established through said radiation device and said first window which effects rapid removal of heat from the liquid circulating through said tube.

10. Heat exchange apparatus comprising fluid impermeable means forming a housing defining an air compression chamber, said housing having first and second windows formed therein, a radiator device overlying each of said windows, said radiator devices each comprising a continuous liquid conducting tube defining a tortuous circuit and thermally connected to a plurality of spaced heat conducting fins, said fins and said tube of each radiator device being proportioned to make the respective radiator devices substantially coextensive with the windows which they overlie, one end of the tube of one of said radiator devices being connected to one end of the tube of the other of said radiator devices, means for supplying heated coolant to the other end of one of said tubes, said housing being formed with an air supply opening of a size on the order of the size of said window openings, an air impelling device positioned in said air supply opening and comprising air impelling blades acting over an area that is substantially the same as the area of the space defined by said air supply opening, and means for actuating said blades to pack said chamber with air, whereby, on actuation of said blades, a high volume air flow is simultaneously established through said radiation devices and said first and second windows which effects concurrent rapid removal of heat from the liquid circulation through said tubes of the respective radiation devices.

11. A portable coolant apparatus comprising fluid impermeable means forming a housing defining an air compression chamber having a volume on the order of a cubic foot, said housing having first and second windows formed therein, a radiator device overlying each of said windows, said radiator devices each comprising a continuous liquid conducting tube defining a tortuous circuit and thermally connected to a plurality of spaced heat conducting fins, said fins and said tube of each radiator device being proportioned to make the respective radiator devices substantially coextensive with the windows which they overlie, one end of the tube of one of said radiator devices being connected to one end of the tube of the other of said radiator devices, means for supplying heated coolant to the other end of one of said tubes, said housing including a reservoir for cooled coolant having a capacity on the order of nine quarts, with the other end of said other tube being connected to said reservoir to supply cooled coolant thereto, means for drawing coolant from said reservoir to supply same to apparatus to be cooled, said housing being formed with an air supply opening of a size on the order of the size of said window openings, an air impelling device positioned in said air supply opening and comprising air impelling blades acting over an area that is substantially the same as the area of the space defined by said air supply opening, and means for actuating said blades to pack said chamber with air, whereby, on actuation of said blades, a high volume air flow is simultaneously established through said radiation devices and said first and second windows which effects concurrent rapid removal of heat from the liquid circulating through said tubes of the respective radiation devices.

References Cited in the file of this patent

UNITED STATES PATENTS

| | | |
|---|---|---|
| 2,091,219 | Sciaky | Aug. 24, 1937 |
| 2,258,835 | Williams | Oct. 14, 1941 |
| 2,448,396 | Schebler et al. | Aug. 31, 1948 |
| 2,510,207 | Behnke et al. | June 6, 1950 |
| 2,517,739 | Tyrner et al. | Aug. 8, 1950 |
| 2,629,804 | Vooren | Feb. 24, 1953 |
| 2,662,748 | Huber | Dec. 15, 1953 |

FOREIGN PATENTS

| | | |
|---|---|---|
| 878,733 | France | Oct. 26, 1942 |